(No Model.)   F. A. PEARSONS.   2 Sheets—Sheet 1.
LANDING NET.
No. 525,619.   Patented Sept. 4, 1894.
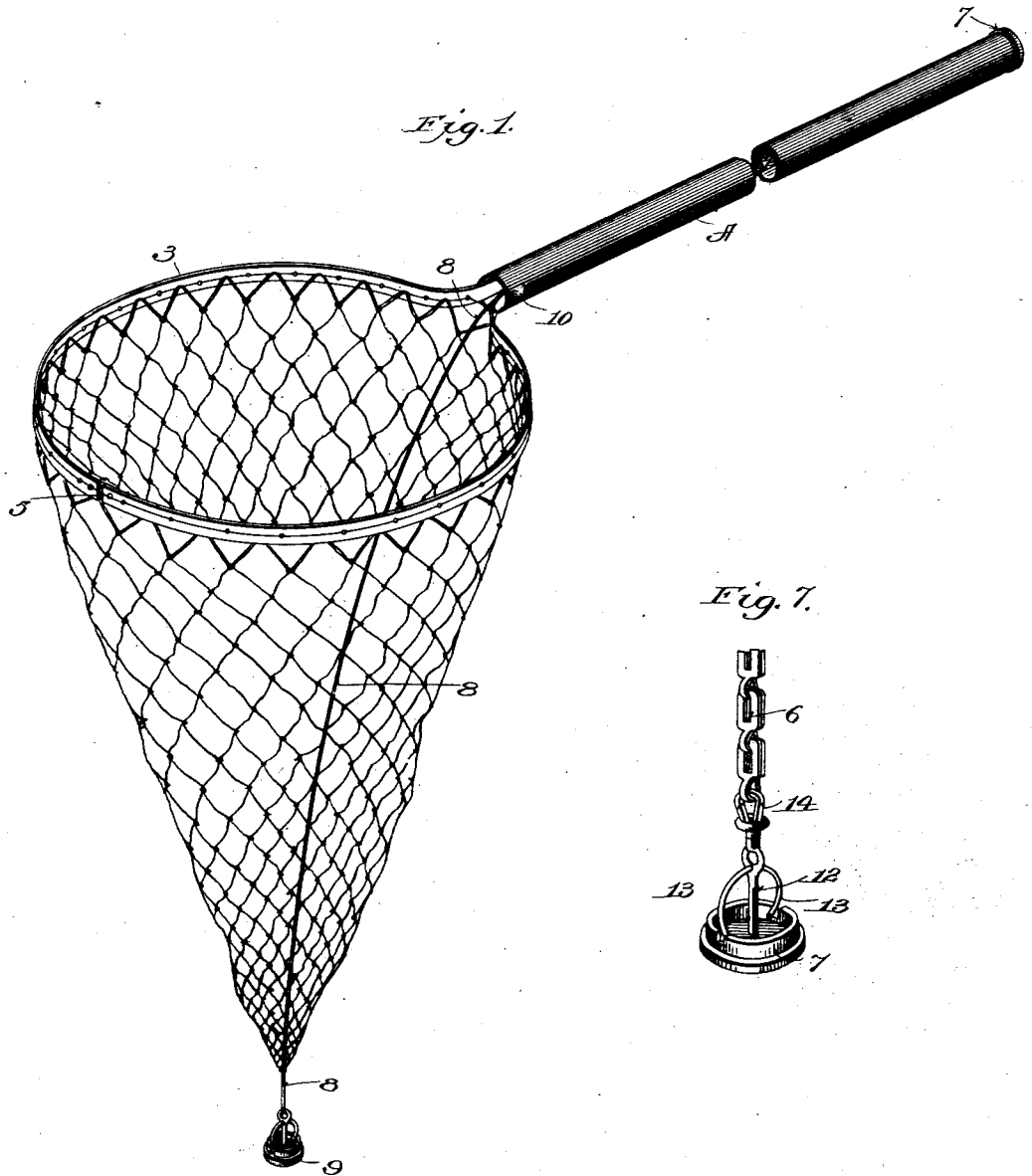

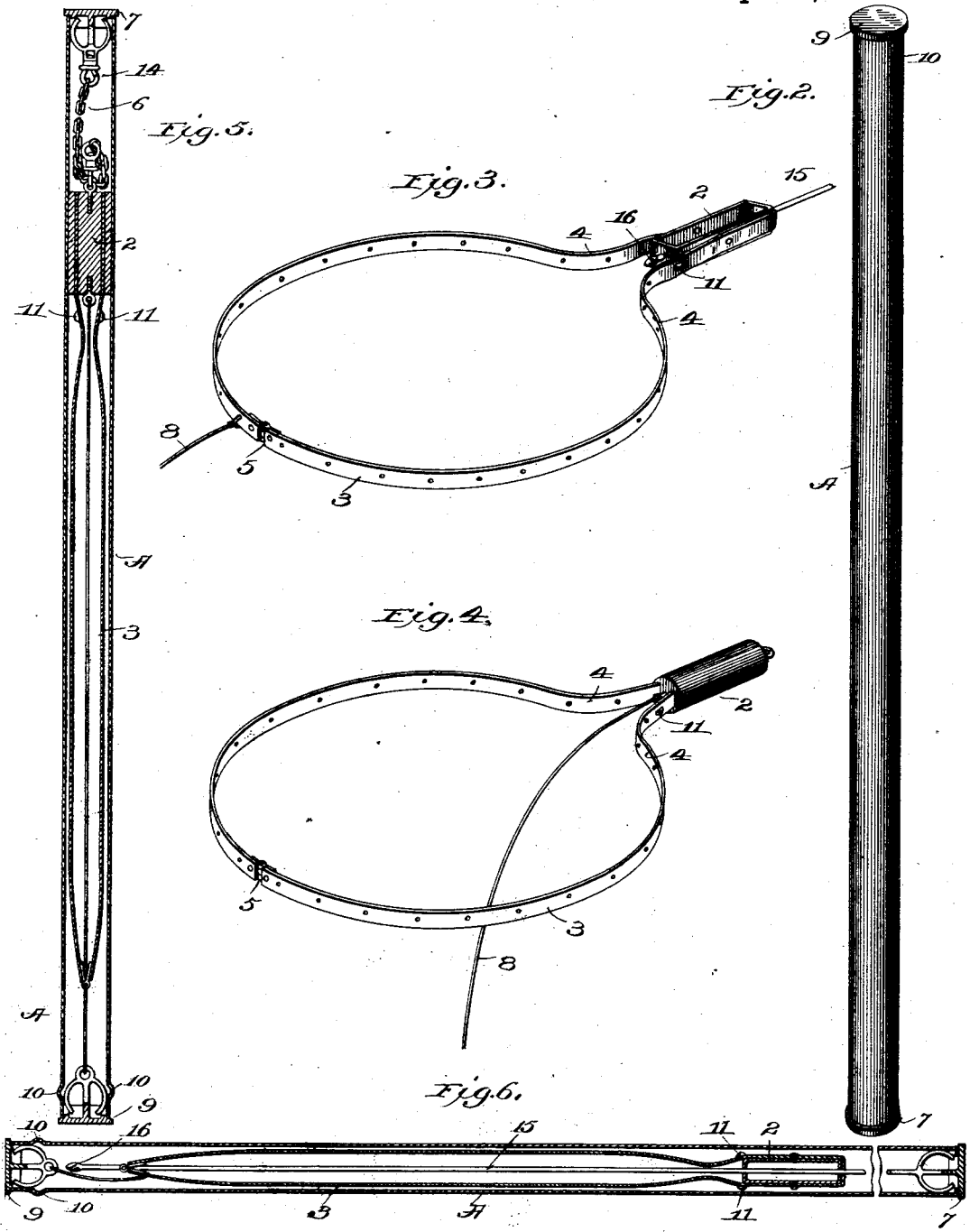

UNITED STATES PATENT OFFICE.

FILLMORE ALBERT PEARSONS, OF RUTLAND, ASSIGNOR OF ONE-HALF TO JOHN W. TITCOMB, OF ST. JOHNSBURY, VERMONT.

LANDING-NET.

SPECIFICATION forming part of Letters Patent No. 525,619, dated September 4, 1894.

Application filed December 29, 1893. Serial No. 495,080. (No model.)

*To all whom it may concern:*

Be it known that I, FILLMORE ALBERT PEARSONS, a citizen of the United States, residing at Rutland, in the county of Rutland and State of Vermont, have invented certain new and useful Improvements in Landing-Nets; and I do hereby declare the following to be a full, clear, and exact description of the invention, such as will enable others skilled in the art to which it appertains to make and use the same.

The invention relates to certain new and useful improvements in fish nets and the like, and especially to what are known as landing nets such as are used by anglers and naturalists.

The object in view is to provide a light, strong, compact, and handy instrument of this character, wherein the net will be concealed and protected when not in use, which may be carried upon the person without inconvenience, and which may be effectively handled with one hand.

The invention is fully illustrated in the accompanying drawings, wherein—

Figure 1 is a perspective view of the device, ready for use, a section of the handle being broken out. Fig. 2 is a similar view of the device closed up for transportation or storage. Figs. 3 and 4 are perspectives of the net frame, the plug and the means for sliding the frame in and out of the handle. Figs. 5 and 6 are central longitudinal sections of the device closed as in Fig. 2, showing how the net and frame are housed in the handle. Fig. 7 is a perspective view of the stopper for closing the rear end of the tube, and a portion of the chain connection.

Referring to Fig. 1, A indicates a hollow imperforate, tubular handle open at both ends.

2 denotes a plug fitting the bore of the tube and adapted to slide therein.

3 is a net rim or frame carried by the plug, and adapted to be drawn into the barrel of the handle by sliding the plug backward within the same, and to be projected out of the handle when the plug is slid toward the front end. This frame is automatically distensible, and is composed of curved spring arms 4 secured at their inner ends to the plug, and connected together at their outer ends by a pivot or hinge 5 which permits the frame to collapse or fold up when drawn into the tube, all as fully shown in Fig. 3.

6 denotes a chain, cord, or rod, attached to the rear end of the plug 2 and extending to or out of the hand-hold end of the handle, and which constitutes the means for pulling back the plug and drawing the net frame and net into the interior of the handle. The opposite end of the connection is attached to a stopper, cap, or button 7, adapted to close the rear end of the tube when the net is out and in use, and also when the net has been drawn into the handle.

8 is a flexible cord or chain connected with the opposite end of the plug 2, and extending to or out of the front end of the handle, and constituting the means for pulling the plug toward the front end of the tube and drawing the net frame and net out of that end ready for use.

9 indicates a stopper for closing the front end of the tube when the net frame has been pulled into the interior of the handle. It is in all respects like the stopper for the other end of the tube, and is connected to the end of the flexible connection 8.

The net may be of any shape and style preferred, and is connected to the rim or frame in any suitable manner. A cylindrical handle is preferable, although the invention is not confined to any particular shape. In order to prevent the net frame from turning when a cylindrical handle is used, notches or recesses 10 are formed in the tube near the front end, into which notches catch detents or points 11 on the spring arms of the net frame.

The interior of the tube is smooth and plain, and the plug slides freely therein, being limited only by the connections 6 and 8 with the stoppers 7 and 9 for closing the respective ends of the handle. The connection 6 should be of the proper length to permit the net frame to be drawn out of the front end of the tube, but not long enough to permit the plug to be pulled out, and the connection 8 should be of the right length to permit the net frame to be drawn into the tube far enough to leave space for the lower end of the net to be drawn well in also. It is not material whether the front chain be connected to the plug or to the outer end of the net frame. It is preferable, however, to attach it directly to the plug, as shown in Fig. 4, and to carry it down to the end of the net, as in Fig. 1, for in this position the weight of the stopper serves to keep the net extended, and acts also as a sinker.

The invention, though not limited to any particular form or construction of cap or stopper for closing the ends of the tube, embraces a construction of spring stopper which is extremely simple and has been found to be convenient and effectual. As seen in Fig. 7, the stopper proper is of an old and well known form. From the center of the top, however extends inward a short stem 12 having outwardly and backwardly extending spring arms 13, the opposite ends of which arms are free and play in notches cut in the inner flange of the stopper. When the stoppers are in place, these spring arms act on the inner wall of the tube and prevent them from falling out.

It is sometimes desirable, as in wading, to have a landing net with a stub handle. In Fig. 5 it will be noticed that the rear end stopper is connected to the chain 6 by a snap hook 14. The object of this arrangement is to allow the detachment of the chain from the stopper to permit the net frame and plug 2 to be pulled entirely out of the handle and detached, when the net can be used by utilizing the plug for a stub handle.

The operation of the device will be readily understood from the foregoing when taken in connection with the illustration. The net being out ready for use, as in Fig. 1, in order to pull the same into the handle and close the device up, it is only necessary to take hold of the rear cap and pull the plug back into the rear end of the tube, the chain 6 of course being pulled out of the end. When the net has been drawn entirely in, the stopper 9 will close the front end of the tube without further attention, and there will be space enough left in the rear end of the tube to allow the chain to be folded therein so that the rear end of the tube can be closed by the stopper 7.

Although I prefer to use a flexible connection between the rear end stopper and the plug for pulling the net frame into the handle, the invention is not limited thereto. In Figs. 3 and 6 I show a stiff rod connection instead of a flexible chain as in the other figures. This rod 15 is rigidly connected to the rear end stopper 7 and extends forward and passes loosely through the plug 2, being provided at its front end with a head or enlargement 16. When the net frame is drawn out of the handle in position for use, the plug abuts against the head 16, and in pulling out the rear end stopper 7 to draw the net frame into the handle, the head pulls the plug back. When the plug has been drawn back until the front end stopper closes the opening of the tube, the rod 15 may then be slid forward through the plug as shown in Fig. 6 until the rear end stopper closes that end of the handle.

Having thus described the invention, what I claim is—

1. In a landing net, the combination of an open-ended tubular handle, a sliding net frame inclosed within the same, and connections from said frame extending to opposite ends of the handle, whereby the frame may be projected from or drawn within the handle; substantially as described.

2. In a landing net, the combination of an open-ended tubular handle, a sliding net frame inclosed within the same, stoppers for closing the ends of the tube, and connections between the net frame and the stoppers whereby the net frame may be projected from or drawn within the handle; substantially as described.

3. In a landing net, the combination of an open-ended tubular handle, a sliding net frame inclosed within the same, mechanism for projecting and withdrawing the net frame, notches or recesses in or near one end of the handle, and spring detents on the frame for engaging the notches and preventing the frame from turning; substantially as described.

4. In a landing net, the combination of an open-ended tubular handle, a sliding plug fitting the bore of the tube, and an automatically distensible net frame, the latter consisting of curved spring arms secured at their inner ends to the plug and pivoted together at their outer ends; substantially as described.

5. In a landing net, the combination of an open-ended tubular handle, a sliding net frame inclosed within the same, stoppers for closing the ends of the tube, and connections between the net frame and stoppers, the stoppers having bow-shaped spring arms to engage the inner wall of the tube; substantially as described.

In testimony whereof I affix my signature in presence of two witnesses.

FILLMORE ALBERT PEARSONS.

Witnesses:
C. W. MUSSEY,
C. H. WEST.